US012032396B2

(12) United States Patent
Murakami

(10) Patent No.: US 12,032,396 B2
(45) Date of Patent: Jul. 9, 2024

(54) VOLTAGE GENERATING CIRCUIT AND SEMICONDUCTOR DEVICE FOR SUPPRESSING LEAKAGE CURRENT

(71) Applicant: Winbond Electronics Corp., Taichung (TW)

(72) Inventor: Hiroki Murakami, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 150 days.

(21) Appl. No.: 17/846,017

(22) Filed: Jun. 22, 2022

(65) Prior Publication Data

US 2023/0087732 A1 Mar. 23, 2023

(30) Foreign Application Priority Data

Sep. 22, 2021 (JP) ................................ 2021-153901

(51) Int. Cl.
*G05F 1/565* (2006.01)

(52) U.S. Cl.
CPC .................................... *G05F 1/565* (2013.01)

(58) Field of Classification Search
CPC ....................................................... G05F 1/565
See application file for complete search history.

(56) References Cited

U.S. PATENT DOCUMENTS 9,671,804 B2 6/2017 Kronmueller et al.
2003/0081436 A1* 5/2003 Takahashi ............... G05F 1/465 363/62
2005/0024127 A1* 2/2005 Kihara .................. G11C 11/417 327/540
2007/0045744 A1* 3/2007 Ito ...................... H03K 17/6872 257/355
2007/0085596 A1* 4/2007 Ito .................... H03K 19/00384 327/534
2016/0233831 A1* 8/2016 Murata ...................... H03L 5/00
2017/0103788 A1* 4/2017 Levisse .................. H10B 61/00
2017/0199540 A1* 7/2017 Tseng ........................ G05F 3/30

FOREIGN PATENT DOCUMENTS

CN 110568895 12/2019
JP 2021082094 5/2021
TW I664798 7/2019

* cited by examiner

*Primary Examiner* — Jue Zhang
*Assistant Examiner* — Lakaisha Jackson
(74) *Attorney, Agent, or Firm* — JCIPRNET

(57) ABSTRACT

Disclosed is a voltage generating circuit including a reference voltage generating part, a leakage current monitoring part, a control part, and an internal voltage generating part. The reference voltage generating part generates a reference voltage. The leakage current monitoring part generates a monitoring leakage current corresponding to a leakage current of an internal circuit of a semiconductor device. The control part controls the reference voltage according to the monitoring leakage current. The internal voltage generating part receives the reference voltage being controlled by the control part, and supplies an internal voltage to the internal circuit according to the controlled reference voltage. A semiconductor device including the same is also disclosed.

18 Claims, 12 Drawing Sheets

200A

VOLTAGE GENERATING CIRCUIT AND SEMICONDUCTOR DEVICE FOR SUPPRESSING LEAKAGE CURRENT

CROSS-REFERENCE TO RELATED APPLICATION

This application claims the priority benefit of Japanese application no. 2021-153901, filed on Sep. 22, 2021. The entirety of the above-mentioned patent application is hereby incorporated by reference herein and made a part of this specification.

BACKGROUND

Technical Field

The disclosure relates to a voltage generating circuit and a semiconductor device. In particular, the disclosure relates to a voltage generating circuit and a semiconductor device that suppress leakage current.

Description of Related Art

Typically in a semiconductor device, a temperature-compensated voltage corresponding to an operative temperature is generated to operate a circuit so as to maintain reliability of the circuit. For example, when data is read from memory, if a read current is decreased due to temperature changes, the read margin is reduced, and the data cannot be read accurately. Therefore, the temperature-compensated voltage is used for reading data to prevent the decrease of the read current. For example, Japanese Patent Laid-open No. 2021-082094 discloses a voltage generating circuit with a reduced circuit scale, where there is no need for an on-chip temperature sensor or the logic for calculating the temperature-compensating voltage from the result of the temperature sensor.

A semiconductor device, such as resistive random-access memory, can be operated at a low voltage and a constant current, and is suitable for mobile devices of the Internet of Things (IoT) or the like, for example. When the application range of the mobile devices or the like is expanded, the temperature range in the operating environment is also expanded. Therefore, a voltage generating circuit typically mounted in the semiconductor device can generate a temperature-compensated voltage.

FIG. 1 is a diagram of an example of a conventional temperature-compensated voltage generating circuit. A voltage generating circuit 10 includes a bandgap reference (BGR) circuit 20 and an internal voltage generating circuit 30. The BGR circuit 20 generates a reference voltage Vref not related to changes in an external power voltage. The internal voltage generating circuit 30 generates an internal supply voltage INTVDD according to the reference voltage Vref output from the BGR circuit 20.

The internal voltage generating circuit 30 includes an operational amplifier OP and a positive channel metal-oxide-semiconductor (PMOS) transistor Q1. The reference voltage Vref is input to the inverting input terminal (−) of the operational amplifier OP, and a voltage VN of a node N is input to the non-inverting input terminal (+) through negative feedback. An output of the operational amplifier OP is connected to a gate of the transistor Q1. A load of a peripheral circuit 40 is connected to the node N. The operational amplifier OP controls a gate voltage of the transistor Q1 so that the voltage VN of the node N is equal to the reference voltage Vref (VN=Vref). Accordingly, the current flowing through the transistor Q1 becomes a constant current not related to changes in a supply voltage VDD, and the peripheral circuit 40 is supplied with the internal supply voltage INTVDD of the constant current (INTVDD=VN).

When flash memory is on standby in a standby mode, as an operative temperature increases, a leakage current flowing to the peripheral circuit 40 increases. Various integrated circuits using complementary metal-oxide-semiconductor (CMOS) transistors or the like are formed in the peripheral circuit 40. In these circuits, a leakage current of the positive-negative junction (PN junction) and a threshold leakage current of the transistors increase as the temperature increases. In addition, since the leakage current is related to the voltage, the leakage current also increases as the internal supply voltage INTVDD increases due to external factors.

To suppress leakage currents, some semiconductor devices adopts a deep power-down (DPD) mode, which can further reduce power consumption compared to the standby mode. In the DPD mode, operation of the internal voltage generating circuit 30 is paused. For example, a switch is disposed between the supply voltage VDD and the transistor Q1. In the stage where operation of the internal voltage generating circuit 30 is paused, Q1 is turned off to accordingly cut off the power supply of the supply voltage VDD.

However, the DPD mode has the following issues. When the supply voltage VDD is cut off by the DPD mode, the peripheral circuit 40 becomes floating. In addition, during the recover from the DPD mode, it is required to charge capacitors of circuit elements and wires of the peripheral circuit 40, resulting in time consumption that prevents promptly performing the next operation.

SUMMARY

The disclosure provides a voltage generating circuit and a semiconductor device that can suppress a leakage current without using a DPD mode.

According to an embodiment of the disclosure, a voltage generating circuit includes a reference voltage generating part, a leakage current monitoring part, a control part, and an internal voltage generating part. The reference voltage generating part generates a reference voltage. The leakage current monitoring part generates a monitoring leakage current corresponding to a leakage current of an internal circuit of a semiconductor device. The control part controls the reference voltage according to the monitoring leakage current. The internal voltage generating part receives the reference voltage being controlled by the control part, and supplies an internal voltage to the internal circuit according to the controlled reference voltage.

According to an embodiment of the disclosure, a semiconductor device includes the voltage generating circuit according to any one of the embodiments of the disclosure, and includes a standby mode operated under low power consumption. The voltage generating circuit supplies an internal voltage to an internal circuit in the standby mode.

According to the embodiments of the disclosure, the reference voltage is controlled according to the monitoring leakage current for monitoring the leakage current of the internal circuit, and the internal voltage is supplied to the internal circuit according to the controlled reference voltage. Therefore, the temperature-compensated reference voltage can be generated autonomously, so that the leakage current of the internal circuit can be suppressed to the minimum.

To make the aforementioned more comprehensible, several embodiments accompanied with drawings are described in detail as follows.

Figure 4A:
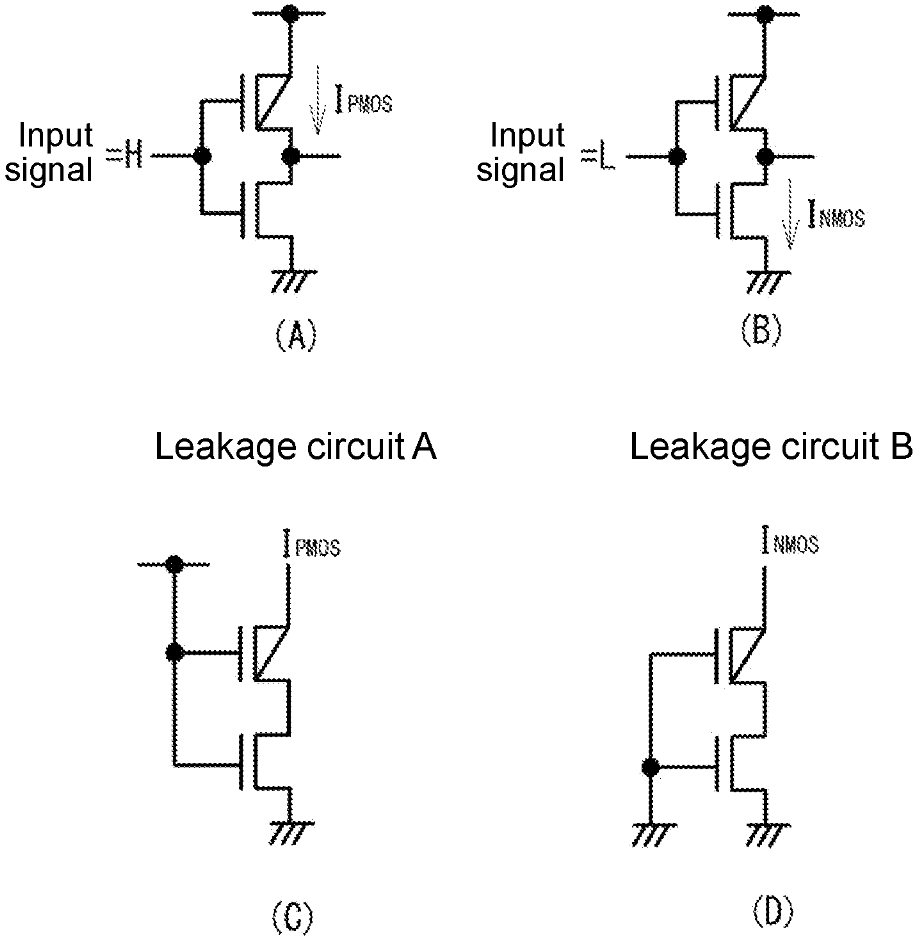

(A) of FIG. 4A, (B) of FIG. 4A, (C) of FIG. 4A, and (D) of FIG. 4A are schematic diagrams of leakage current monitoring parts according to embodiments of the disclosure.

Figure 4B:
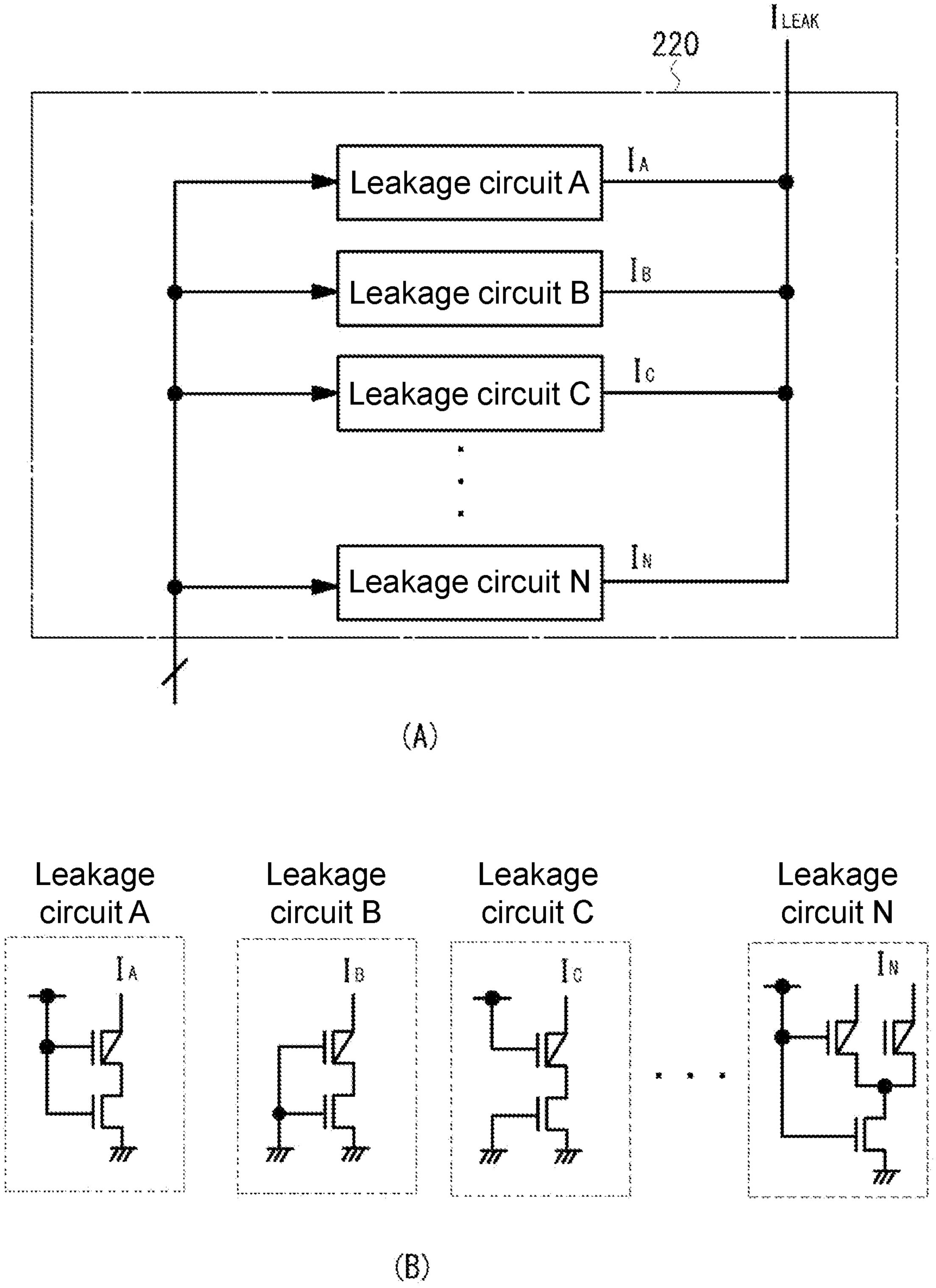

(A) of FIG. 4B and (B) of FIG. 4B are schematic diagrams of leakage current monitoring parts according to embodiments of the disclosure.

Figure 5:
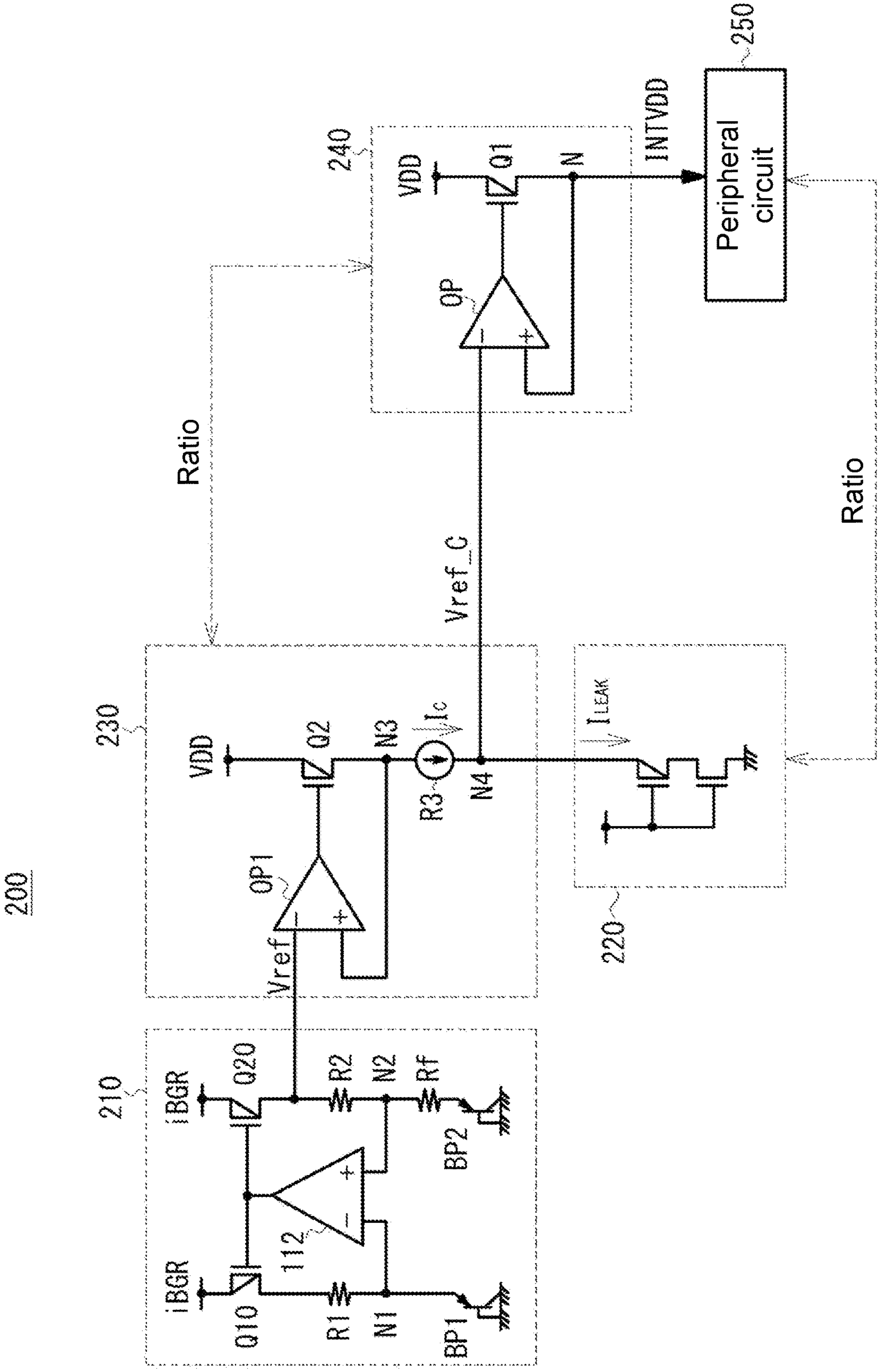

FIG. 5 is a schematic diagram of the voltage generating circuit according to the second embodiment of the disclosure.

Figure 6:
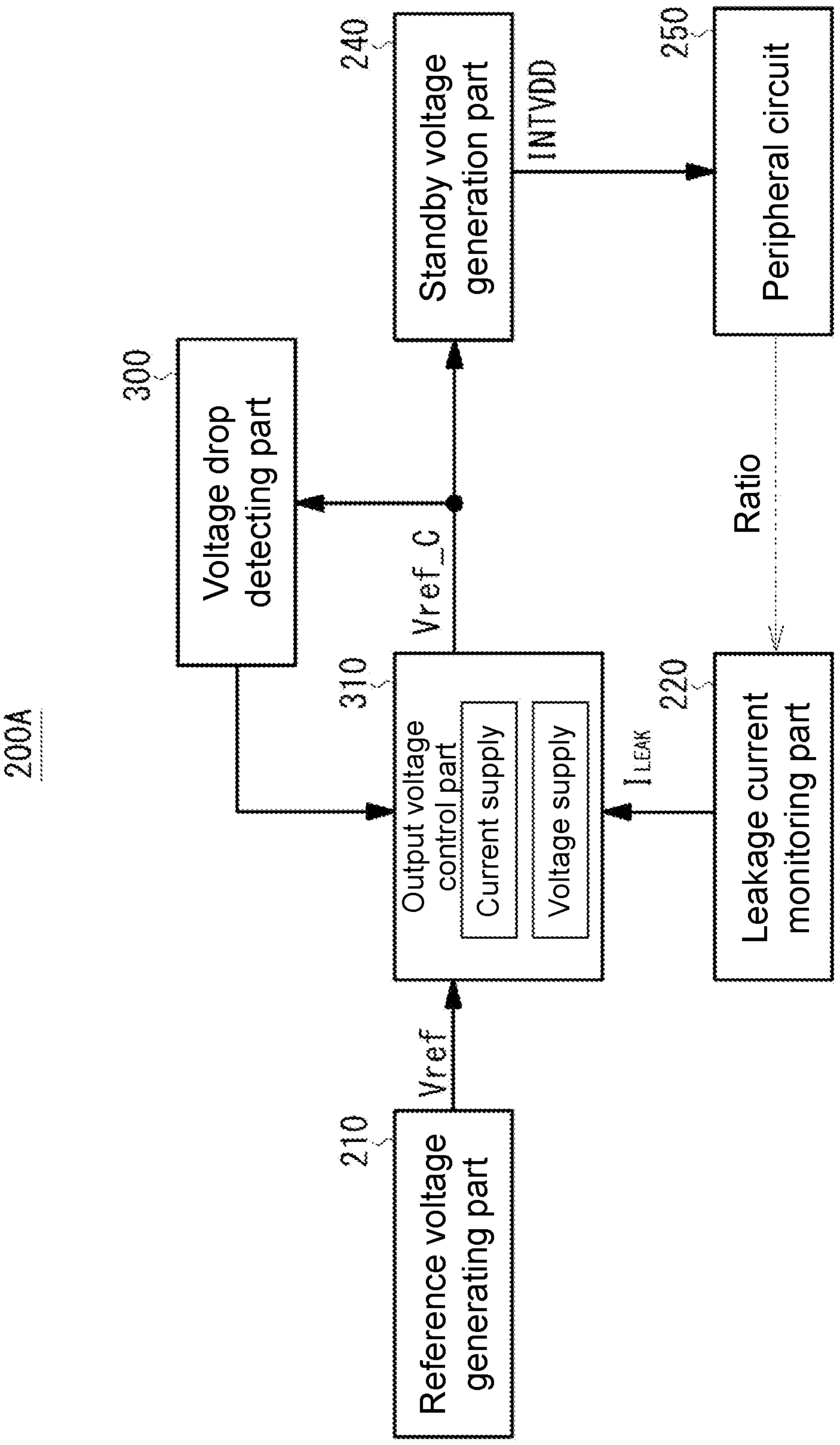

FIG. 6 is a block diagram of a structure of a voltage generating circuit according to a third embodiment of the disclosure.

Figure 7:
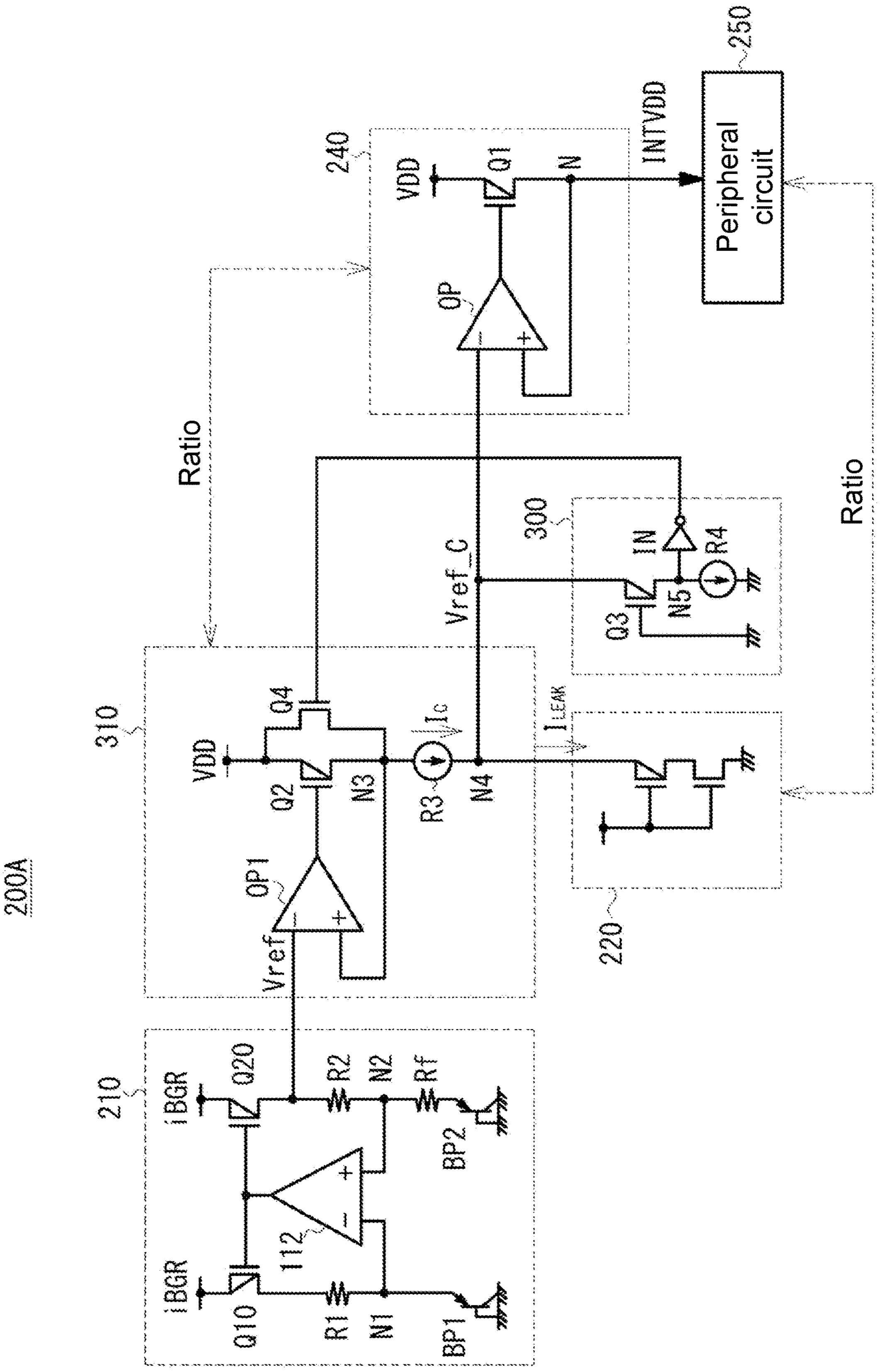

FIG. 7 is a schematic diagram of a first example of the voltage generating circuit according to the third embodiment of the disclosure.

Figure 8:
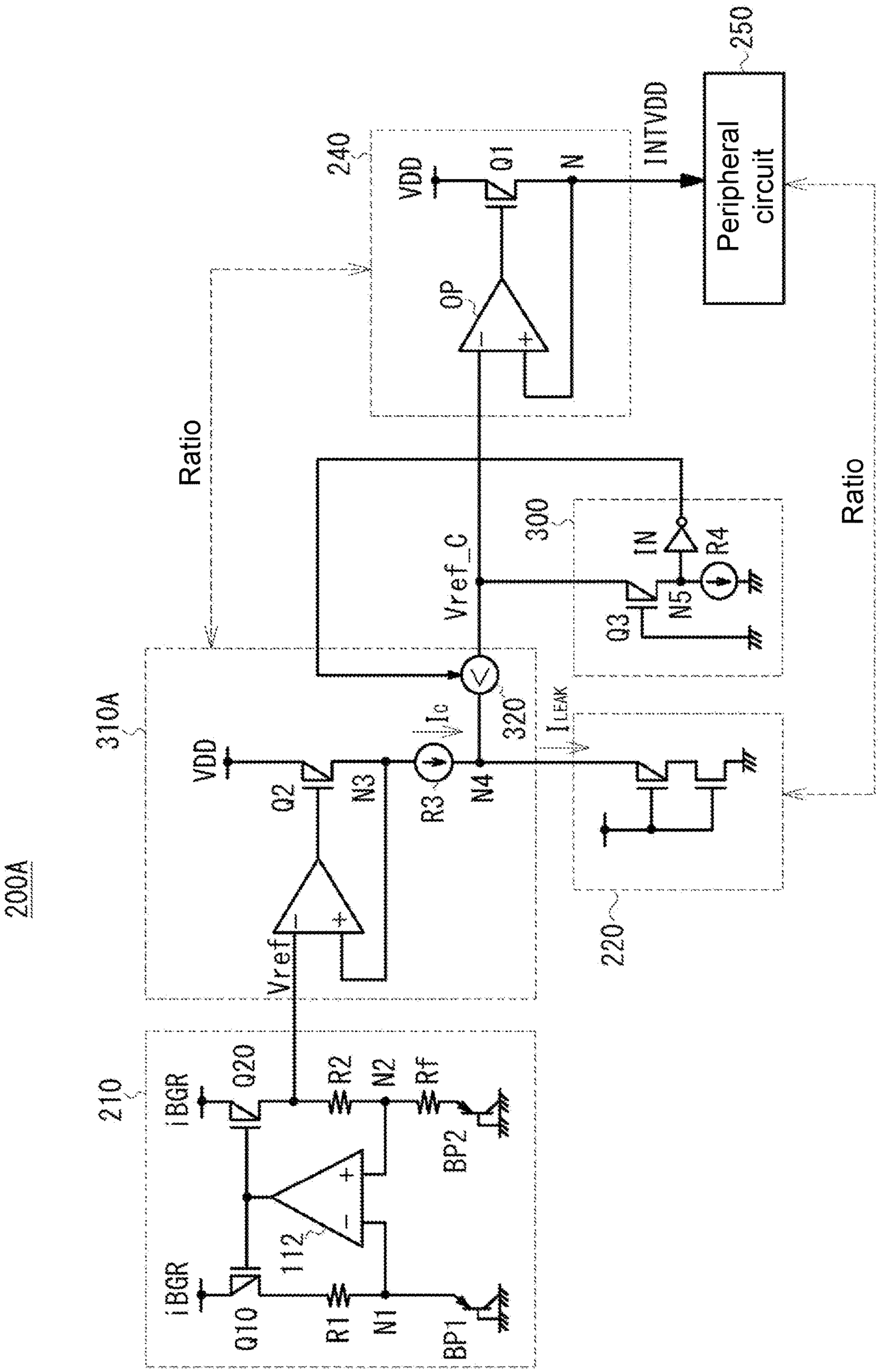

FIG. 8 is a schematic diagram of a second example of the voltage generating circuit according to the third embodiment of the disclosure.

Figure 9:
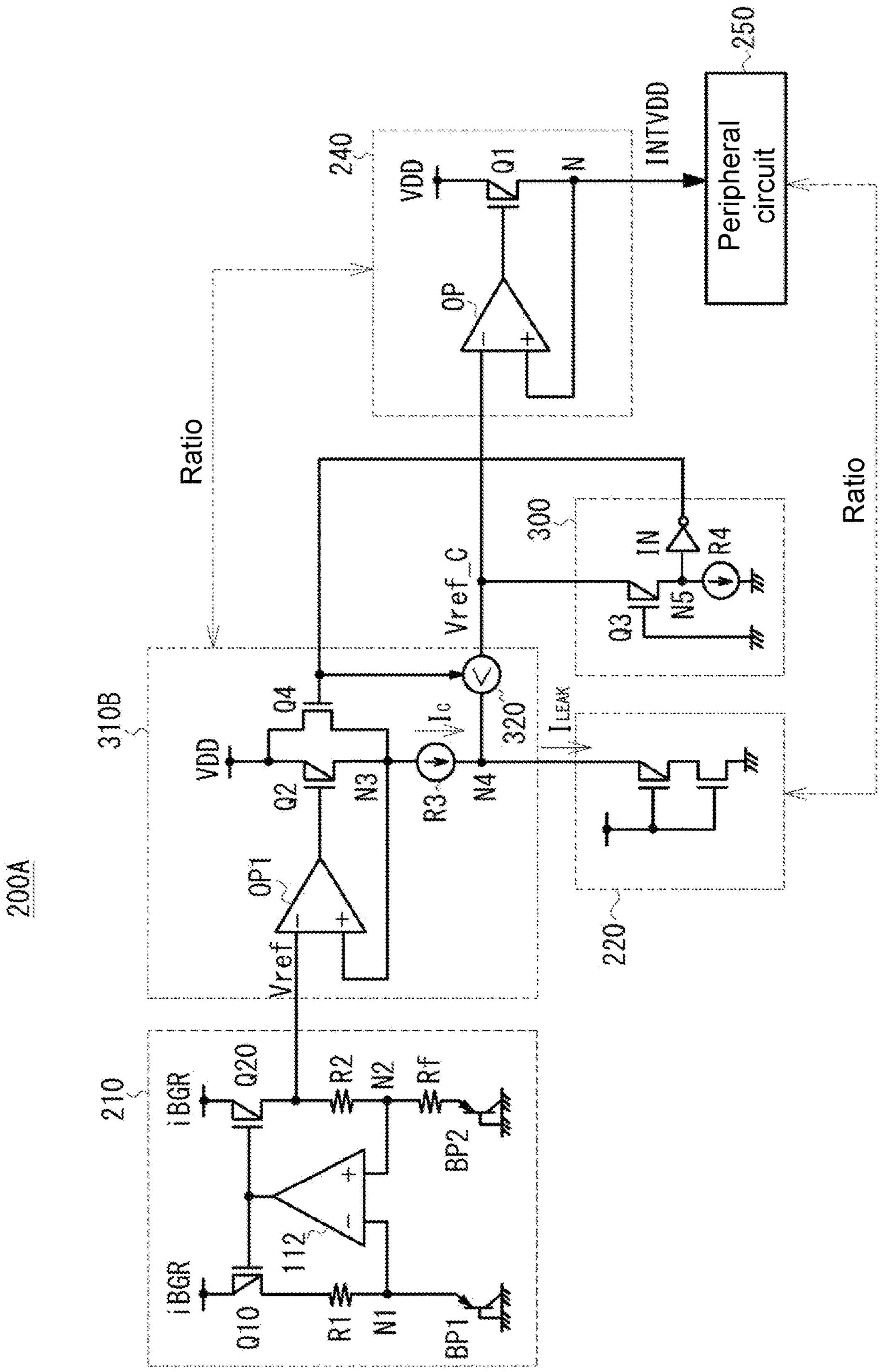

FIG. 9 is a schematic diagram of a third example of the voltage generating circuit according to the third embodiment of the disclosure.

Figure 10:
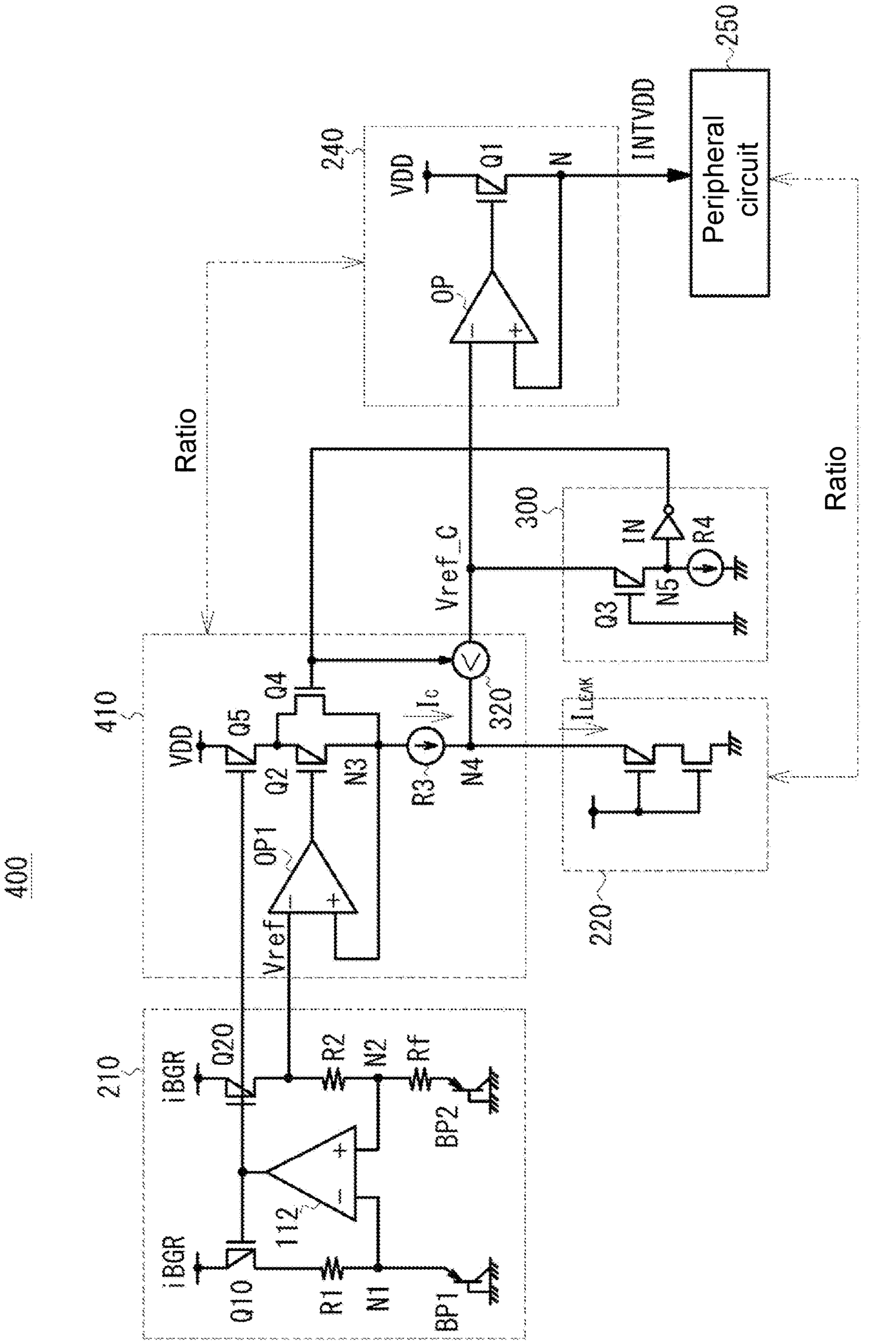

FIG. 10 is a schematic diagram of a voltage generating circuit according to a fourth embodiment of the disclosure.

Figure 11:
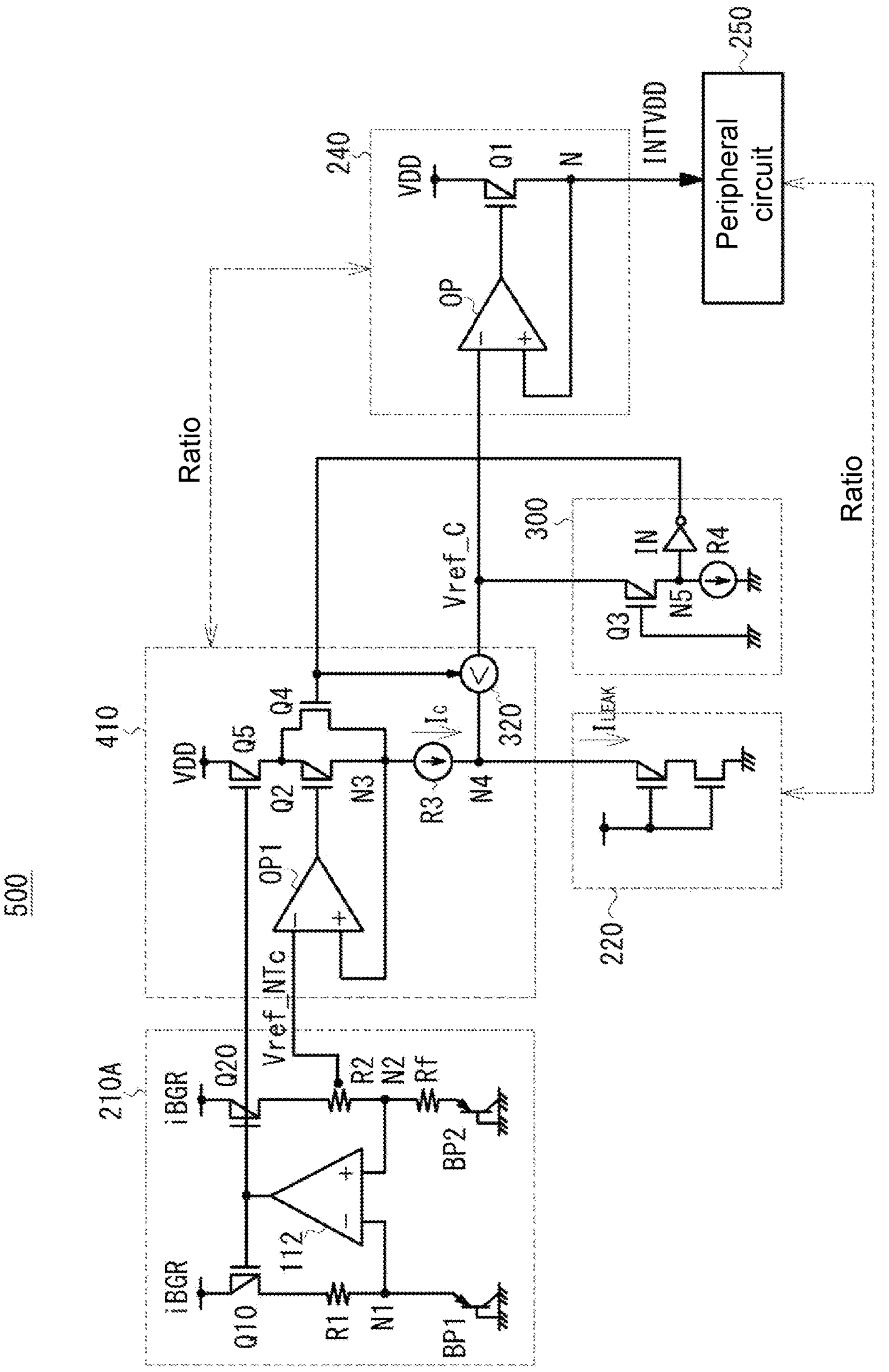

FIG. 11 is a schematic diagram of a voltage generating circuit according to a fifth embodiment of the disclosure.

DESCRIPTION OF THE EMBODIMENTS

A voltage generating circuit according to an embodiment of the disclosure is mounted in semiconductor memory, such as flash memory, dynamic memory, static memory, resistive random-access memory, and magnetic memory, or semiconductor devices such as logic circuits and signal processing.

Figure 2:
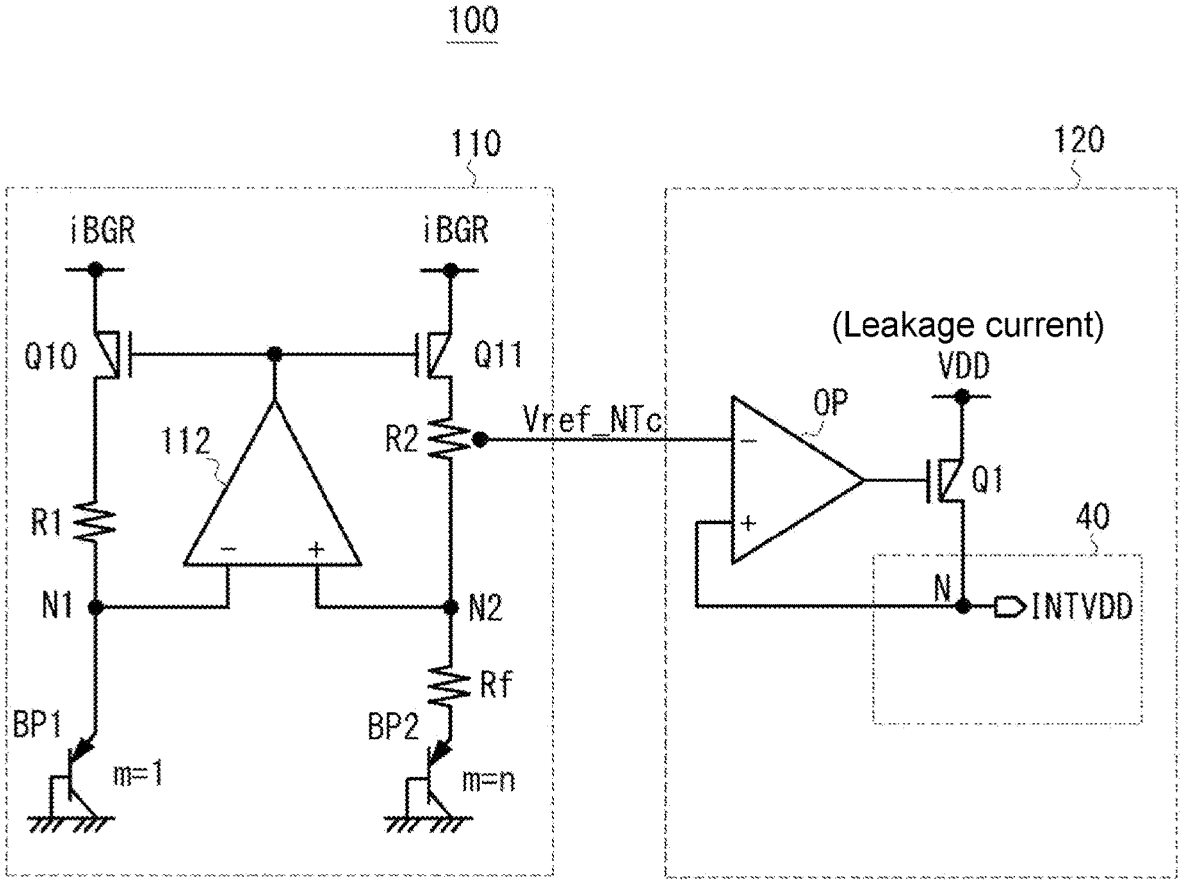
FIG. 2 is a schematic diagram of a voltage generating circuit according to a first embodiment of the disclosure.

With reference to FIG. 2, a voltage generating circuit 100 of this embodiment includes a reference voltage generating circuit (BGR circuit) 110 and an internal voltage generating circuit 120. The voltage generating circuit 100 is mounted in flash memory, for example, and supplies the internal supply voltage INTVDD to the peripheral circuit 40 when the flash memory is in a standby state. During this period, the peripheral circuit 40 is turned into a low power consumption mode, but will be operated in response to a command input from the outside, for example.

The BGR circuit 110 utilizes the physical property, namely the bandgap voltage, of the semiconductor material silicon to generate a stable reference voltage in a low correlation with respect to changes in the temperature and power voltage. The BGR circuit 110 includes a first and a second current paths between the power voltage VDD and a ground (GND). The first current path consists of a PMOS transistor Q10, a resistor R1, and a positive-negative-positive (PNP) bipolar transistor BP1 connected in series. The second current path includes a PMOS transistor Q11 (having the same structure as the transistor Q10), a resistor R2 (having the same resistance value as the resistor R1), a resistor Rf, and a PNP bipolar transistor BP2 connected in series. The BGR circuit 110 also includes an operational amplifier 112. A connection node N1 between the resistor R1 and the bipolar transistor BP1 is connected to the inverting input terminal (−) of the operational amplifier 112, a connection node N2 between the resistor R2 and the resistor Rf is connected to the non-inverting input terminal (+) of the operational amplifier 112, and the output terminal of the operational amplifier 112 is commonly connected to the gates of the transistor Q10 and the transistor Q11.

An emitter area ratio of the bipolar transistor BP1 to the bipolar transistor BP2 is 1:n (where n is a number greater than 1), and the current density of the bipolar transistor BP1 is n times that of the bipolar transistor BP2. Furthermore, although bipolar transistors are taken as the example here, diodes having an area ratio of 1:n may also be used to replace bipolar transistors.

The operational amplifier 112 controls gate voltages of the transistor Q10 and the transistor Q11 so that the voltage of the node N1 is equal to the voltage of the node N2. Accordingly, an equal current $I_B$ flows in the first current path and the second current path. An inter-terminal voltage $V_{Rf}$ of the resistor Rf is represented by the following formula.

$$V_{Rf}=kT/qIn(n)$$

where k is the Boltzmann constant, T is the absolute temperature, and q is the charge of the electron.

The current $I_B$ flowing in the resistor Rf is represented by the following formula.

$$IB=V_{Rf}/Rf=T/Rf\times k/qln(n)$$

where the temperature-related factor is T/Rf, and the current $I_B$ has a positive temperature coefficient.

In addition, if a resistor at the selected tap position of the resistor R2 is set to a resistor R2', a reference voltage Vref_NTc is represented by the following formula.

$$V\mathrm{ref\_}NTc=V_{N2}+I_BR2'$$

where $V_{N2}$ is the voltage of the node N2.

In an embodiment, the resistor R2 includes a semiconductor material having a negative temperature coefficient. In other words, the resistance decreases as the temperature increases, and comparatively, the resistance increases as the temperature decreases. The resistor R2 is formed of, for example, a conductive polysilicon layer doped with a high concentration of dopant and an N+ diffusion region. By properly choosing the tap position of the resistor R2, the reference voltage Vref_NTc may have the expected negative temperature coefficient. The tap position or the negative temperature coefficient is determined according to the size of the reference voltage supplied to the internal voltage generating circuit 120 at the expected maximum temperature.

Figure 1:
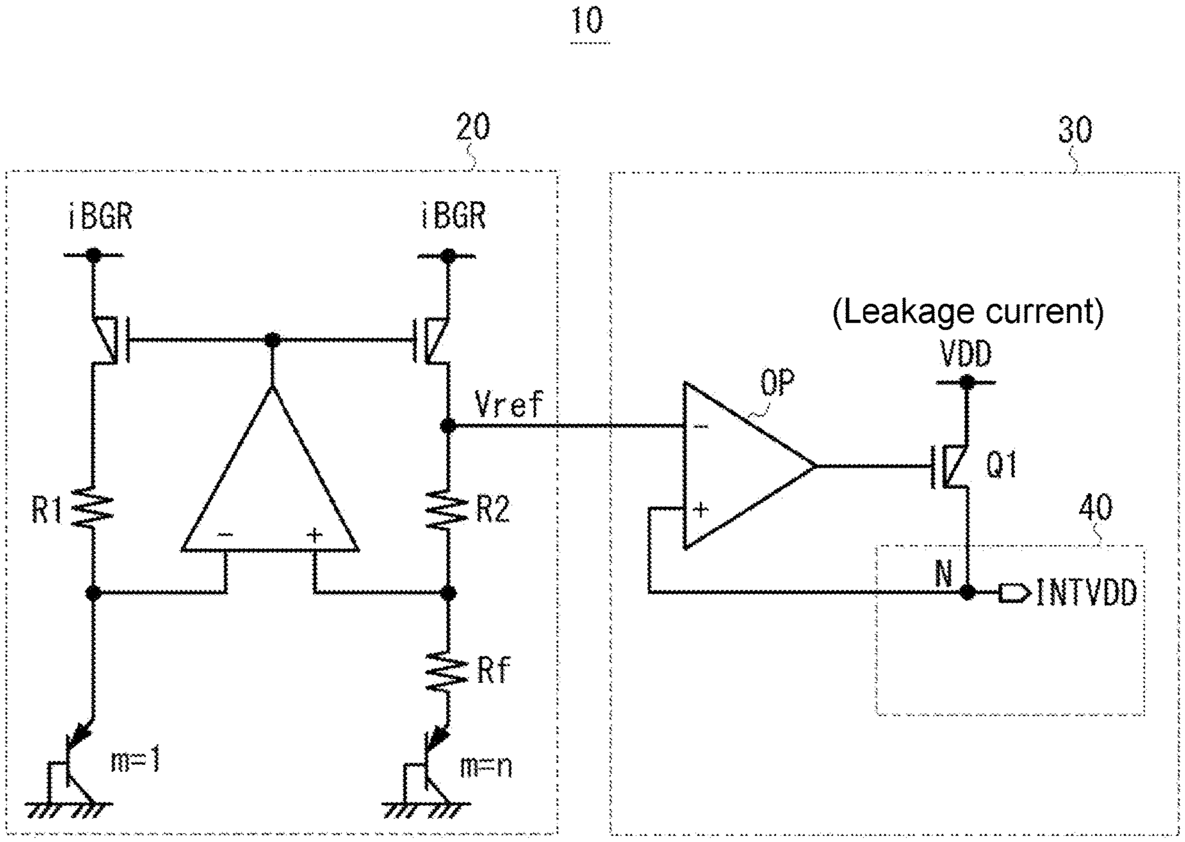
FIG. 1 (RELATED ART)
FIG. 1 is a schematic diagram of a conventional voltage generating circuit.

The internal voltage generating circuit 120 has the same formation as the internal voltage generating circuit 30 shown in FIG. 1. With reference to FIG. 2, the reference voltage generated by the BGR circuit 110 is input to the inverting input terminal (−) of the operational amplifier OP of the internal voltage generating circuit 120, and the voltage VN of the node N is input to the non-inverting input terminal (+) through negative feedback. The internal voltage generating circuit 120 supplies the internal supply voltage INTVDD generated according to the reference voltage Vref_NTc from the node N to the peripheral circuit 40.

In this embodiment, the flash memory does not adopt the DPD mode, that is, does not change from a standby mode to the DPD mode, but suppresses a leakage current generated in the peripheral circuit 40 to the minimum in the standby mode. In the standby mode, as the operative temperature increases, the reference voltage Vref_NTc generated in the BGR circuit 110 decreases since it has a negative temperature coefficient. The decrease of the reference voltage Vref_NTc in turn decrease the internal supply voltage INTVDD generated by the internal voltage generating circuit 120. The leakage currents generated by the leakage of the PN junction of the peripheral circuit 40, off-state leakage of the transistor, or the like increase as the operative temperature increases. However, since these leakage currents are related to the internal supply voltage INTVDD, if the internal supply voltage INTVDD decreases, the leakage current decreases accordingly.

In this embodiment, since the reference voltage Vref_NTc has a negative temperature coefficient, if the temperature increases, the reference voltage Vref_NTc decreases, which cancels the increasing leakage current of the peripheral circuit 40. In addition, since the DPD mode is not adopted, the next active operation may be implemented without considering the delay time of recovery from the DPD mode.

In the first embodiment, it is required to trim the resistor R2 at the time of manufacturing or shipping so that the reference voltage Vref_NTc falls within a certain voltage range when the operative temperature increases. Nonetheless, in the actual case, since the leakage current increases not linearly but exponentially with a certain temperature as a limit, trimming the resistor R2 is complicated. In addition, when the operative temperature exceeds the expected temperature, the reference voltage Vref_NTc may deviate from the certain voltage range. As a result, for example, when the reference voltage Vref_NTc is lower than the minimum operating voltage of the CMOS transistor of the peripheral circuit 40, the peripheral circuit 40 can no longer be operated in response to a command input in the standby state. Therefore, a second embodiment provides a voltage generating circuit that autonomously generates a temperature-compensated reference voltage Vref without trimming the reference voltage generating part 110.

Figure 3:
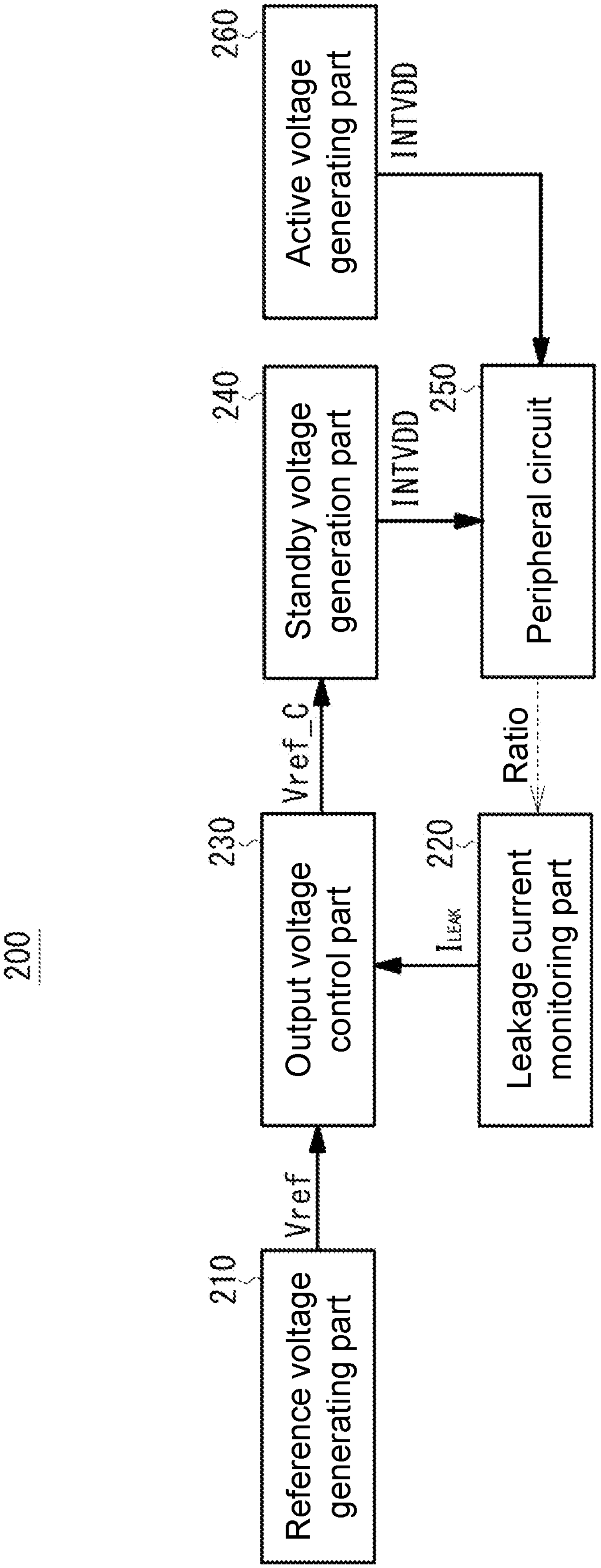
FIG. 3 is a block diagram of a structure of a voltage generating circuit according to a second embodiment of the disclosure.

With reference to FIG. 3, a voltage generating circuit 200 of the second embodiment includes a reference voltage generating part 210, a leakage current monitoring part 220, an output voltage control part 230, and a standby voltage generating part 240. The reference voltage generating part 210 generates the reference voltage Vref. The leakage current monitoring part 220 monitors a leakage current $I_{LEAK\_PERI}$ of a peripheral circuit 250 in a standby state, and generates a corresponding leakage current $I_{LEAK}$. The output voltage control part 230 receives the reference voltage Vref, and outputs a controlled reference voltage Vref_C according to the leakage current $I_{LEAK}$ generated by the leakage current monitoring part 220. The standby voltage generating part 240 generates the internal supply voltage INTVDD according to the controlled reference voltage Vref_C. In the standby state, the peripheral circuit 250 is operated under low power consumption by the internal supply voltage INTVDD generated by the standby voltage generating part 240, and in the active state, the peripheral circuit 250 is operated by the internal supply voltage INTVDD generated by an active voltage generating part 260.

The reference voltage generating part 210 includes, for example, the BGR circuit shown in FIG. 2, and supplies the reference voltage Vref to the output voltage control part 230. The leakage current monitoring part 220 generates the leakage current $I_{LEAK}$ having a certain ratio relative to the leakage current $I_{LEAK\_PERI}$ generated in the peripheral circuit 250 in the standby state. The peripheral circuit 250 includes various circuits using a CMOS transistor and the like. When the flash memory is in the standby mode, these circuits are in a state that they may be operated by the internal supply voltage INTVDD from the standby voltage generating part 240. On the other hand, the decrease of a threshold voltage of the transistor and the miniaturization of the transistor increase an off-state leakage current flowing between the source/drain of the transistor (the off-state leakage current also including PN junction leakage and gate leakage). Therefore, it is required to suppress the leakage current of the peripheral circuit 250 in the standby state to the minimum.

In an embodiment, the leakage current monitoring part 220 includes a CMOS transistor formed by connecting at least one PMOS transistor and one NMOS transistor in series to monitor the leakage current of the peripheral circuit 250. A channel width of each of the PMOS transistor and the NMOS transistor has a certain ratio R relative to the sum of channel widths of a PMOS transistor and an NMOS transistor of the entire CMOS transistor of the peripheral circuit 250. In other words, an off-state leakage current $I_{LEAK}$×R of the CMOS transistor of the leakage current monitoring part 220 is approximate to the off-state leakage current $I_{LEAK\_PERI}$ of the peripheral circuit 250.

To further improve the accuracy of the leakage current $I_{LEAK}$ generated by the leakage current monitoring part 220, the structure of the CMOS transistor of the peripheral circuit 250 may also be considered. In other words, during the off-state leakage of the CMOS transistor, there is an off-state leakage current $I_{PMOS}$ in the case where the PMOS transistor is turned off and the NMOS transistor is turned on when the input signal is at a high (H) level as shown in (A) of FIG. 4A, and an off-state leakage current $I_{NMOS}$ in the case where the PMOS transistor is turned on and the NMOS transistor is turned off when the input signal is at a low (L) level as shown in (B) of FIG. 4A. Since the sizes of the off-state leakage current $I_{PMOS}$ and the off-state leakage current $I_{NMOS}$ are different, the total number S_P of CMOS transistors whose PMOS transistors are turned off and the total number S_N of CMOS transistors whose NMOS transistors are turned off in the peripheral circuit 250 are calculated. The leakage current monitoring part 220 includes a leakage circuit A and a leakage circuit B. In the leakage circuit A, the PMOS transistors are turned into off-state leakage transistors having a certain ratio relative to the sum of channel widths of the total number S_P of the PMOS transistors as shown in (C) of FIG. 4A. In the leakage circuit B, the NMOS transistors are turned into off-state leakage transistors having a certain ratio relative to the sum of channel widths of the total number S_N of the NMOS transistors as shown in (D) of FIG. 4A. By connecting the leakage circuit A and the leakage circuit B in parallel, the sum of the leakage current $I_{PMOS}$ and the leakage current $I_{NMOS}$ is turned into the leakage current $I_{LEAK}$.

The leakage current monitoring part 220 may also include a plurality of leakage circuits to generate the leakage current $I_{LEAK}$ considering more leakage properties of the peripheral circuit 250. Various logic circuits (inverters, AND gates, NAND gates, and so on) utilizing CMOS transistors are formed in the peripheral circuit 250, and the logic circuits cause the leakage current to be different in size. Therefore, as shown in (A) of FIG. 4B, various leakage circuits, i.e., the leakage circuit A, the leakage circuit B, and a leakage circuit C to a leakage circuit N, having different leakage properties may be prepared, and a leakage circuit selected by a trim signal Trim may be operated according to the structure of the peripheral circuit 250.

For example, the leakage circuit A generates the off-state leakage current of the PMOS transistor, the leakage circuit B generates the off-state leakage current of the NMOS transistor, the leakage circuit C generates the off-state leakage currents of the PMOS transistor and the NMOS transistor, and the leakage circuit N generates the off-state leakage current of the PMOS transistor of the NAND gate. For example, the leakage circuit A to the leakage circuit N selected by melting a fuse are operated by the trim signal Trim.

In addition, each of the leakage circuit A, the leakage circuit B, the leakage circuit C, . . . , the leakage circuit N performs scaling on the ratios of the leakage currents of the corresponding logic circuits of the peripheral circuit 250. Therefore, multiple sets of CMOS transistors are included, and a selected number of CMOS transistors from the multiple sets of CMOS transistors are operated. The selection is performed by the trim signal Trim. For example, with P groups of the leakage circuits A connected in parallel, to obtain a certain ratio relative to the leakage currents of the corresponding CMOS inverters of the peripheral circuit 250, a selected number of the leakage circuits A from the P groups by the trim signal Trim are operated. For example, a number of the leakage circuits A selected by melting a fuse by the trim signal Trim are operated.

The leakage circuit A, the leakage circuit B, the leakage circuit C, . . . , the leakage circuit N are connected in parallel. The sum of a leakage current $I_A$, a leakage current $I_B$, a leakage current $I_C$, . . . , a leakage current $I_N$ generated by the leakage circuits is turned into the leakage current $I_{LEAK}$. The leakage current $I_{LEAK}$ increases as the operative temperature increases, and the leakage current $I_{LEAK}$ decreases as the operative temperature decreases.

Accordingly, the leakage current monitoring part 220 generates the leakage current $I_{LEAK}$ obtained from monitoring the leakage current $I_{LEAK\_PERI}$ of the peripheral circuit 250 in the standby state, and provides the generated leakage current $I_{LEAK}$ to the output voltage control part 230.

The output voltage control part 230 controls the reference voltage Vref according to the leakage current $I_{LEAK}$. Specifically, the output voltage control part 230 decreases the reference voltage Vref_C as the leakage current $I_{LEAK}$ increases, and the output voltage control part 230 increases the reference voltage Vref_C as the leakage current $I_{LEAK}$ decreases. The reference voltage Vref_C controlled by the output voltage control part 230 is supplied to the standby voltage generating part 240.

The standby voltage generating part 240 has the same formation as the internal voltage generating circuit 120 shown in FIG. 2, for example. The standby voltage generating part 240 receives the reference voltage Vref_C, and supplies the internal supply voltage INTVDD equal to the reference voltage Vref_C to the peripheral circuit 250. As the operative temperature of the peripheral circuit 250 increases, the reference voltage Vref_C decreases and the internal supply voltage INTVDD decreases accordingly. Therefore, the leakage current $I_{LEAK\_PERI}$ of the peripheral circuit 250 is suppressed to save power. During switching from the standby state to the active state, the internal supply voltage INTVDD is supplied from the active voltage generating part 260 to the peripheral circuit 250.

FIG. 5 is a detailed circuit diagram of the voltage generating circuit 200 according to the second embodiment of the disclosure. The reference voltage generating part 210 generates the reference voltage Vref with a BGR circuit and provides the reference voltage Vref to the output voltage control part 230. Furthermore, different from the reference voltage Vref_NTc of the first embodiment, the reference voltage Vref has a positive temperature coefficient.

Similar to the standby voltage generating part 240, the output voltage control part 230 includes a constant current circuit (a unit gain buffer OP1, a transistor Q2), and generates the voltage Vref not related to changes in the external power voltage VDD on a node N3. A resistor R3 is connected between the node N3 and a node N4. A constant current $I_C$ is generated on the node N4. The constant current $I_C$ has a certain ratio relative to a constant current $I_C$ PERI generated by the standby voltage generating part 240 ($I_{LEAK\_PERI}$:$I_{LEAK}$=$I_{C\_PERI}$:$I_C$). In other words, a channel width of the transistor Q2 is adjusted to a certain ratio relative to a channel width of the transistor Q1.

The leakage current monitoring part 220 is connected to the node N4 of the output voltage control part 230. Here, it is taken as an example that the leakage current monitoring part 220 includes the leakage circuit A. The constant current $I_C$ generated on the node N4 flows to the GND due to the leakage current $I_{LEAK}$ generated by the leakage current monitoring part 220. As a result, the reference voltage Vref_C controlled by the difference ($I_C$−$I_{LEAK}$) between the constant current $I_C$ and the leakage current $I_{LEAK}$ is generated on the node N4. In other words, the reference voltage Vref_C decreases as the leakage current $I_{LEAK}$ increases with the rising temperature, and the reference voltage Vref_C increases as the leakage current $I_{LEAK}$ decreases with the decreasing temperature. Accordingly, the controlled reference voltage Vref_C corresponding to the temperature changes is autonomously generated.

In the second embodiment, the reference voltage Vref_C is autonomously changed according to the temperature changes. However, since the leakage current increases sharply at a certain temperature, it is possible that the reference voltage Vref_C may be lower than the minimum operating voltage of the CMOS of the peripheral circuit 250. Therefore, in a third embodiment, feedback control is performed to prevent the reference voltage Vref_C from being lower than the minimum operating voltage of the CMOS.

With reference to FIG. 6, a voltage generating circuit 200A of the third embodiment includes a voltage drop detecting part 300 and an output voltage control part 310, and in addition thereto, the reference voltage generating part 210, the leakage current monitoring part 220, and the standby voltage generating part 240 are the same as in the second embodiment.

The voltage drop detecting part 300 monitors the temperature-compensated reference voltage Vref_C output by the output voltage control part 310, detects that the reference voltage Vref_C drops to a threshold voltage Vth near the minimum operating voltage Vmin of the CMOS (Vref_C−Vmin≤threshold voltage Vth), and provides a detection result to the output voltage control part 310.

Similar to the second embodiment, the output voltage control part 310 outputs the reference voltage Vref_C corresponding to the leakage current $I_{LEAK}$ of the leakage current monitoring part 220. However, when it is detected that the reference voltage Vref_C has dropped to the threshold voltage Vth, the reference voltage Vref_C is controlled to be higher than the threshold voltage Vth. In an embodiment, the output voltage control part 310 cancels the leakage current $I_{LEAK}$ by increasing the constant current $I_C$ flowing from the external power voltage VDD to the node N3, accordingly increasing the reference voltage Vref_C. In another embodiment, the output voltage control part 310 increases the reference voltage Vref_C by offsetting the direct current (DC) voltage. Accordingly, the internal supply voltage INTVDD of the standby voltage generating part 240 is prevented from being lower than the minimum operating voltage of the CMOS, ensuring the operation of the peripheral circuit 250.

FIG. 7 is a diagram showing a first structural example of the voltage generating circuit 200A of the third embodiment of the disclosure, where the same structures are labeled with the same reference numerals as in FIG. 5. The voltage drop detecting part 300 monitors the temperature-compensated reference voltage Vref_C of the node N4. The voltage drop detecting part 300 includes a PMOS transistor Q3 whose source is connected to the node N4, a resistor R4 which is connected to the constant current flowing between the transistor Q3 and the ground, and an inverter IN connected to a node N5 between the transistor Q3 and the resistor R4. The gate of the transistor Q3 is connected to the ground, and the transistor Q3 is turned on.

When the reference voltage Vref_C is sufficiently high compared to the minimum operating voltage of the CMOS, the transistor Q3 is strongly turned on to turn the node N5 into an H level and turn the output of the inverter IN into an L level. As the reference voltage Vref_C decreases to Vref_C−Vmin≤Vth, the gate-source voltage $V_{GS}$ of the transistor Q3 decreases, the drain current of the transistor Q3 decreases, the node N5 is turned into an L level, and the output of the inverter IN is turned into an H level.

The output voltage control part 310 includes an NMOS transistor Q4 connected in parallel with the transistor Q2 between the external supply voltage VDD and the node N3. The gate of the transistor Q4 is connected to the output of the inverter IN of the voltage drop detecting part 300. As the reference voltage Vref_C decreases and the output of the inverter IN is turned into H, the transistor Q4 is turned on, and a current $I_{ADD}$ is supplied to the node N3. The dimensions of the transistor Q4 are adjusted as follows. The current $I_{ADD}$ cancels the leakage current $I_{LEAK}$ which increases sharply as the temperature increases, and the reference voltage Vref_C is turned to be higher than the level detected by the voltage drop detecting part 300.

When the reference voltage Vref_C is sufficiently increased compared to the minimum operating voltage of the CMOS, the output of the inverter IN of the voltage drop detecting part 300 is turned into an L level, and the supply of the current $I_{ADD}$ is paused. Furthermore, the supply of the current $I_{ADD}$ is not limited to those described above, and may also be performed in other manners.

FIG. 8 is a diagram showing a second structural example of the voltage generating circuit 200A of the third embodiment of the disclosure, where the same structures are labeled with the same reference numerals as in FIG. 7. In the second structural example, an output voltage control part 310A includes a voltage offset part 320. The voltage offset part 320 increases the voltage of the reference voltage Vref_C in a positive direction according to the output of the inverter IN of the voltage drop detecting part 300. The voltage offset part 320 includes, for example, a pull-up transistor for connecting the reference voltage Vref_C to the external power voltage VDD. The transistor is turned on in response to the output of the inverter IN at an H level to offset the reference voltage Vref_C in the positive direction.

When the reference voltage Vref_C is sufficiently increased compared to the minimum operating voltage of the CMOS, the output of the inverter IN of the voltage drop detecting part 300 is turned into an L level, and the voltage offset performed by the voltage offset part 320 is paused. Furthermore, the voltage offset is not limited to those described above, and may also be performed in other manners.

FIG. 9 is a diagram showing a third structural example of the voltage generating circuit 200A of the third embodiment of the disclosure, where the same structures are labeled with the same reference numerals as in FIG. 7 and FIG. 8. In the third structural example, an output voltage control part 310B includes each of the transistor Q4 for supplying the current $I_{ADD}$ shown in FIG. 7 and the voltage offset part 320 for offsetting the reference voltage Vref_C in the positive direction shown in FIG. 8. The transistor Q4 and the voltage offset part 320 increase the reference voltage Vref_C in response to detecting that the reference voltage Vref_C drops by the voltage drop detecting part 300 to prevent the reference voltage Vref_C from being lower than the minimum operating voltage of the CMOS. According to the third structural example, the reference voltage Vref_C may be increase within a short time compared to the first structural example and the second structural example.

Next, a fourth embodiment of the disclosure will be described. FIG. 10 is a schematic diagram showing a voltage generating circuit of the fourth embodiment, where the same structures are labeled with the same reference numerals as in FIG. 9. In a voltage generating circuit 400 of this embodiment, an output voltage generating part 410 includes the transistor Q10 of the BGR circuit of the reference voltage generating part 210 and a PMOS transistor Q5 forming a current mirror with a transistor Q20. The transistor Q5 is connected between the external power voltage VDD and the transistor Q2. The gate of the transistor Q5 is commonly connected to the gates of the transistor Q10 and the transistor Q20.

The transistor Q5 is formed to have a size having a certain current mirror ratio K relative to the transistor Q10/Q20, and the current $I_C$ flowing to the output voltage control part 410 is K times iBGR (where K is a value of 1 or more). In addition, since a current (iBGR) flowing in the BGR circuit has a positive temperature coefficient, the current $I_C$ flowing to the output voltage control part 410 also has a positive temperature coefficient. Therefore, the current $I_C$ increases as the temperature increases. In the meanwhile, the leakage current $I_{LEAK}$ generated by the leakage current monitoring part 220 also increases. As a result, the reference voltage Vref_C is prevented from sharply decreasing. Furthermore, although the output voltage control part 410 includes the transistor Q4 and the voltage offset part 320 adding the current $I_{ADD}$ in response to the detection result of the voltage drop detecting part 300, the output voltage control part 410 may also be a structure including either.

Next, a fifth embodiment of the disclosure will be described. FIG. 11 is a schematic diagram showing a voltage generating circuit of the fifth embodiment, where the same structures are labeled with the same reference numerals as in FIG. 10. In a voltage generating circuit 500 of this embodiment, a reference voltage generating part 210A has the same formation as the first embodiment. In other words, the reference voltage generating part 210A supplies the reference voltage Vref_NTc having a negative temperature coefficient to the output voltage control part 410.

In this embodiment, the reference voltage Vref_NTc decreases as the temperature increases. On the other hand, as the current $I_C$ increases, the leakage current $I_{LEAK}$ also increases. If the increase of the current $I_C$ is canceled by the leakage current $I_{LEAK}$, the reference voltage Vref_C decreases with the decrease of the reference voltage Vref_NTc, and the leakage current of the peripheral circuit 250 is suppressed. Furthermore, although the output voltage control part 410 includes the transistor Q4 and the voltage offset part 320 adding the current $I_{ADD}$ in response to the detection result of the voltage drop detecting part 300, the output voltage control part 410 may also be a structure including either.

The properties of the voltage generating circuit of this embodiment are summarized as follows.

1. The internal supply voltage INTVDD of the standby voltage generating part 240 ensures the minimum operating voltage of the CMOS over the entire range for temperature compensation.
2. The internal supply voltage INTVDD of the standby voltage generating part 240 is controlled at the minimum DC level at the highest temperature within the range for temperature compensation.
3. By using a lower internal supply voltage INTVDD, the junction leakage current, the gate leakage current, and the off-state leakage current of the transistor of the integrated circuit in the peripheral circuit 250 can be suppressed to the minimum.
4. By maintaining the internal supply voltage INTVDD at a lower level to replace cutting power supply off in the deep power-down mode (DPD), the time of recovery to the active operation can be shortened compared to the deep power saving mode.

Furthermore, the voltage generating circuit of this embodiment is applied to the standby state of the flash memory, but this is an example. The disclosure may be applied to the voltage supply to the internal circuit not related to the standby state. Further, the disclosure may be applied to the voltage generating circuit providing the expected internal voltage to the internal circuit of semiconductor devices other than flash memory.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A voltage generating circuit comprising:

a reference voltage generating part generating a reference voltage;

a leakage current monitoring part generating a monitoring leakage current corresponding to a leakage current of a peripheral circuit;

a control part controlling the reference voltage according to the monitoring leakage current; and an internal voltage generating part receiving the reference voltage being controlled by the control part, and supplying an internal voltage to the peripheral circuit according to the controlled reference voltage, wherein the control part comprises a constant current circuit, wherein the constant current circuit generates a constant current, an output node of the constant current circuit is connected to the leakage current monitoring part, and the controlled reference voltage is output from the output node.

2. The voltage generating circuit of claim 1, further comprising a detecting part, wherein the detecting part detects that the controlled reference voltage has dropped to a certain level, and the control part controls the controlled reference voltage according to a detection result of the detecting part.

3. The voltage generating circuit of claim 2, wherein the certain level is a voltage higher than a minimum operating voltage of a complementary metal-oxide-semiconductor transistor of the peripheral circuit.

4. The voltage generating circuit of claim 2, wherein the leakage current monitoring part comprises a monitoring transistor configured to generate the monitoring leakage current and perform off-state leakage, and a channel width of the monitoring transistor is formed to have a certain ratio relative to a channel width of the total number of transistors performing off-state leakage of the peripheral circuit.

5. The voltage generating circuit of claim 2, wherein the leakage current monitoring part comprises a variety of monitoring transistors configured to perform off-state leakage, and a channel width of each of the monitoring transistors is formed to have a certain ratio relative to a channel width of the total number of corresponding transistors performing off-state leakage of the peripheral circuit.

6. The voltage generating circuit of claim 2, wherein the leakage current monitoring part comprises a plurality of leakage circuits, and one leakage circuit selected from the plurality of leakage circuits is operated to generate the monitoring leakage current.

7. The voltage generating circuit of claim 2, wherein the control part increases the controlled voltage when the detecting part detects that the controlled voltage has dropped to the certain level.

8. The voltage generating circuit of claim 7, wherein the control part adds an additional current to a constant current according to the detection result of the detecting part.

9. The voltage generating circuit of claim 7, wherein the control part increases the controlled reference voltage in a positive direction according to the detection result of the detecting part.

10. The voltage generating circuit of claim 1 wherein the leakage current monitoring part comprises a monitoring transistor configured to generate the monitoring leakage current and perform off-state leakage, and a channel width of the monitoring transistor is formed to have a certain ratio relative to a channel width of the total number of transistors performing off-state leakage of the peripheral circuit.

11. The voltage generating circuit of claim 10, wherein the monitoring transistor is a complementary metal-oxide-semiconductor transistor formed by connecting a positive channel metal-oxide-semiconductor transistor and a negative channel metal-oxide-semiconductor transistor in series.

12. The voltage generating circuit of claim 1, wherein the leakage current monitoring part comprises a variety of monitoring transistors configured to perform off-state leakage, and a channel width of each of the monitoring transistors is formed to have a certain ratio relative to a channel width of the total number of corresponding transistors performing off-state leakage of the peripheral circuit.

13. The voltage generating circuit of claim 1, wherein the controlled reference voltage decreases when the monitoring leakage current increases, and the controlled reference voltage increases when the monitoring leakage current decreases.

14. The voltage generating circuit of claim 1, wherein the constant current circuit generates the constant current according to a reference voltage having a negative temperature coefficient, or the constant current circuit generates the constant current according to a reference voltage having a positive temperature coefficient.

15. The voltage generating circuit of claim 1, wherein the leakage current monitoring part comprises a plurality of leakage circuits, and one leakage circuit selected from the plurality of leakage circuits is operated to generate the monitoring leakage current.

16. The voltage generating circuit of claim 15, wherein the one leakage circuit of the leakage current monitoring part is selected according to a trim signal input from the outside.

17. A semiconductor device comprising the voltage generating circuit of claim 1.

18. The semiconductor device of claim 17, comprising a standby mode operated under low power consumption, wherein the voltage generating circuit supplies an internal voltage to the peripheral circuit in the standby mode.

* * * * *